(12) United States Patent
Larson

(10) Patent No.: US 6,853,413 B2
(45) Date of Patent: Feb. 8, 2005

(54) POLARIZED DISPLAY WITH WIDE-ANGLE ILLUMINATION

(75) Inventor: Brent D. Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/832,965

(22) Filed: Apr. 11, 2001

(65) Prior Publication Data

US 2002/0021387 A1 Feb. 21, 2002

Related U.S. Application Data

(60) Provisional application No. 60/197,705, filed on Apr. 18, 2000.

(51) Int. Cl.[7] .............................................. G02F 1/1335
(52) U.S. Cl. ............................. 349/96; 349/18; 349/117
(58) Field of Search ............................... 349/9, 16, 18, 349/117, 119, 96–103, 118

(56) References Cited

U.S. PATENT DOCUMENTS

| 5,515,186 A | * | 5/1996 | Fergason et al. ............... 349/96 |
| 5,658,490 A | * | 8/1997 | Sharp et al. .................. 349/117 |
| 5,751,388 A | * | 5/1998 | Larson ........................ 349/96 |
| 5,999,240 A | * | 12/1999 | Sharp et al. .................. 349/119 |
| 6,184,955 B1 | | 2/2001 | Okumura ..................... 349/96 |
| 6,215,537 B1 | | 4/2001 | Tsumura et al. .............. 349/98 |

FOREIGN PATENT DOCUMENTS

WO    WO98/32046    *    7/1998

* cited by examiner

*Primary Examiner*—Dung T. Nguyen
(74) *Attorney, Agent, or Firm*—Kurt Luther; Dennis F. Armijo

(57) ABSTRACT

An apparatus and method for improving the brightness of a polarized display at viewing angles off of the vector normal to the display panel. The advantages of the present invention will be most pronounced when employed in applications in which the viewing angle requirements are asymmetric, such as for avionics applications that require cross-cockpit viewability of the display. The present invention overcomes the limitations inherent in earlier designs by introducing a polarization rotation element as part of the display device to rotate the polarization of light from one orientation to another orientation. Through the use of the present invention, the axis in which the angle of sufficient off normal brightness is broadest can be reoriented to an axis that is most ideal for the particular application, thus dramatically improving the overall performance and efficiency of such displays.

23 Claims, 9 Drawing Sheets

POLARIZED DISPLAY WITH WIDE-ANGLE ILLUMINATION

RELATED APPLICATION

This application claims priority of U.S. Provisional Application Ser. No. 60/197,705 entitled "Polarized display with wide-angle illumination," filed on Apr. 18, 2000, the teachings of which are incorporated herein by reference.

FIELD OF THE INVENTION

The present invention relates generally to the field of polarized displays, including, without limitation, liquid crystal displays, ferroelectric displays, projection displays and other similar illuminated display devices and systems. More specifically, the present invention relates generally to polarized displays requiring illumination and viewability across a wide range of viewing angles. The present invention is directed to methods and apparatuses for maximizing the light transmittance of a polarized display in the case where this wide angle illumination is desired.

BACKGROUND OF THE INVENTION

Polarized displays, especially those making use of the unique properties of liquid crystalline materials, are employed in a wide variety of applications. Common polarized display systems are generally configured with two fixed polarizers sandwiching two glass plates on either side of a selectively polarizing material in combination with an array of electrodes for applying electrical fields to selected areas of the selectively polarizing matrix. The selectively polarizing material is typically one which exhibits optical birefringence by which different polarizations of light in the material can propagate through the material at different rates. This allows the polarization state of the incident light to be selectively altered to other polarization states. The polarizing material can include attenuation means, in which rays of one polarization state are selectively attenuated relative to rays of another polarization state.

A liquid crystal display, also known as an LCD, is a well-known example of a polarized display device. Liquid crystals have two principal properties making them useful in electronic display devices: (1) birefringence and (2) selective director alignment. The birefringence property of liquid crystal materials causes light passing through a specimen of one of these materials to change its plane of polarization as it passes through. For example, the plane of polarization may be rotated. The selective director alignment property of these materials causes the director, or locally averaged orientation of the anisotropic molecules in the liquid crystal material, to temporarily align itself with an applied orienting field such as an electric field.

Polarized liquid crystal displays employ these two properties in concert to selectively transmit or block light incident to selected areas of the display screen as desired. In the typical LCD device, incident light is polarized by a first polarizer to a first polarization state. As the light rays pass through the birefringent liquid crystal material, the polarization of the light rays in a given region is altered to a second polarization state. This change of polarization state can take the form of a simple rotation of the polarization but can also result in other polarization configurations such as elliptical polarization. As the light exits through an exit polarizer, light rays not having the third polarization state of the exit polarizer are absorbed. When the applied electric field is changed, the corresponding second polarization state is also changed, and the amount of light passing through the exit polarizer can therefore be controlled. Numerous polarized LCD modes have been developed, including twisted nematic (TN), super-twisted nematic (STN), ferroelectric, antiferroelectric, cholesteric, phase-change, guest-host, vertical-alignment (VA), in-plane switching (IPS), electrically controlled birefringence (ECB), pi-cells and many others. Devices incorporating the above described principles are disclosed in my U.S. Pat. No. 5,751,388, High Efficiency Polarized Display, and my U.S. Pat. No. 5,999,239, Method for Making a Polarization Sensitive Optical Element, which are herein incorporated by reference.

Polarized displays often make use of backlighting to improve the sharpness and brightness of the image thereon. In a backlit polarized display incorporated into a portable computing device, the efficiency of the display is at a premium, due to the demand for extended operation and limited battery power. The bulk of the power consumption of a backlit display is used for the generation of light. Both the efficiency and performance of the polarized display device are directly proportional to the efficiency with which the device concentrates and directs the generated light in a useful manner.

One device known to be useful in increasing image brightness is an optical film. Optical films are used in liquid crystal display systems and in other applications where control over the direction or polarization of light transmitted or reflected is desired in order to increase the brightness of a display. It is known that the luminance within a desired range of viewing angles of a polarized display can be significantly increased through the use of such an optical film.

Essentially, optical films comprise films of light transmissible materials that are designed to redirect light through reflection, refraction, scattering or a combination of these. When used in conjunction with a display screen, an optical film can significantly increase the brightness of a display within a certain desired range of viewing angles by controlling and redirecting light that would otherwise be absorbed or escape from the display at undesirable angles. Light that would otherwise be wasted is reflected or otherwise redirected back into the display or light source where a portion of it can be "recycled" and returned back to the film at an angle or polarization that allows it to escape from the display. This recycling is useful because it can reduce power consumption needed to provide a display with a desired level of brightness. The following patents and PCT publications describe various optical films, which are incorporated herein by reference:

U.S. Pat. No. 5,783,120 (PCT Publication WO 97/32222), A Method for Making an Optical Film;

PCT Publication WO 97/32223, An Optical Film with Co-Continuous Phases;

U.S. Pat. No. 5,825,543, Diffusely reflecting polarizing element including a first birefringent phase and a second phase;

PCT Publication WO 97/32224, An Optical Film;

PCT Publication WO 97/32225, Light Fixture Containing Optical Film;

PCT Publication WO 97/32226, Brightness Enhancement Film;

PCT Publication WO 97/32227, Optical Film with Increased Gain at Non-Normal Angles of Incidence; and PCT Publication WO 97/32230, Optical Fiber with Light Extractor.

Test data from the foregoing types of films, however, clearly show that performance of these films is best for viewing angles close to the vector normal to the display screen. At wider viewing angles, it is known that the performance of such films suffers. There remains in the field a need for display devices having display properties and efficiency superior to those produced by the traditional architecture.

BRIEF SUMMARY OF THE INVENTION

The present invention comprises an apparatus and method for improving the brightness of a polarized display at viewing angles off of the vector normal to the display screen, hereinafter referred to as "off normal brightness." The advantages of the present invention are pronounced when employed in applications in which the viewing angle requirements are asymmetric, such as for avionics applications that require cross-cockpit viewability of the display. In such a case, the desired viewing envelope might be wide in the horizontal axis (e.g., +/−55 degrees), for example, and narrower in the vertical dimension (e.g., less than 30 degrees). Asymmetric viewing requirements are also present in many other display applications, such as computer monitors and television. Despite the asymmetry between horizontal and vertical directions, however, it is still often highly desirable to maintain symmetric performance from side to side.

In most devices suitable for use with the present invention, a rear optical element is located behind the polarized display. As discussed above, test data has shown that certain optical elements, such as optical films, can significantly improve the brightness of a polarized display within the optimal viewing envelope. Many of these optical films remain inadequate, however, for significantly improving the off normal brightness at the wider angles required for many applications.

The prior attempts to have optimized illumination for wide angle polarized displays have suffered from a number of drawbacks and limitations. For example, the resulting display screen may have its widest illumination angle in a plane oriented along the diagonal of the display screen, rather than along the horizontal direction along which it would be most useful.

The present invention overcomes the difficulties described above by introducing a polarization rotation element between the display and the rear element(s) in the display to rotate the plane of polarized light transmitted from the rear optical elements to the rear polarizer. The polarization rotation element can take any of many forms. The choice of which particular element to use will depend upon the details and demands of a particular application. Factors to be considered might include, for example, dispersion, tolerance of chromaticity shifts, efficiency and cost. Through the use of the present invention, the plane in which the angle of sufficient off normal brightness is broadest can be reoriented to a plane that is most ideal for the particular application, thus dramatically improving the overall performance and efficiency of such displays.

The present invention described herein offers a significant advantage in display transmittance for wide viewing angles, and dramatically increases the compatibility of optical elements such as pre-polarizers with wide-viewing angle polarized displays.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The present invention is directed toward a wide viewing angle display in which the viewing angle requirements are asymmetric, such as for avionics applications that require cross-cockpit viewability of the display. In such an application, the ideal viewing envelope is wider in the horizontal axis (perhaps up to 55 degrees off normal) and narrower in the vertical dimension (perhaps less than 30 degrees). Similar viewing conditions can be found in other display applications such as computer monitors and televisions.

In most devices suitable for use with the present invention, one or more rear optical elements are located behind a polarized display panel. The optical elements have transmittance versus viewing angle characteristics that are polarization dependent such as, for example, those polarization-sensitive scattering elements described in my U.S. Pat. No. 5,751,388, High Efficiency Polarized Display, and my U.S. Pat. No. 5,999,239, Method for Making a Polarization Sensitive Optical Element. Due in part to polarization-sensitive reflections at air interfaces and internal interfaces, it is possible for such elements to exhibit higher transmittance when the transmitted light approaches Brewster's angle and the polarization axis of the light falls in or near the plane of incidence/reflection. In other words, higher transmittance is obtained for angles that are oriented in the direction of the pass axis of the rear optical element polarizer of the display device.

Figure 1:
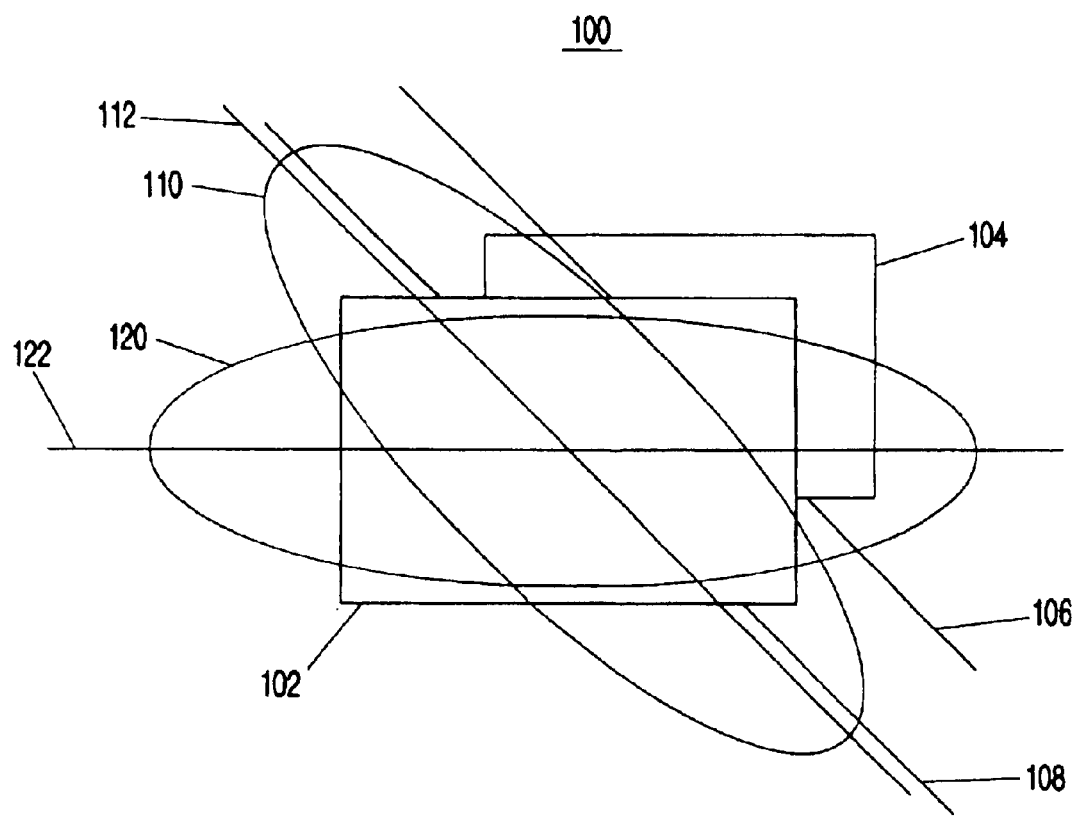
FIG. 1 depicts a prior art polarized display device such as disclosed in my above noted prior patents but also shows desired viewing envelope compared to an actual viewing envelope in a polarized display device.

One such scenario is shown in FIG. 1, depicting a polarized display device 100 comprising a generally rectangular pixellated display panel 102 and a rear element 104 having a linear polarization or pass axis 106 substantially aligned with the pass axis 108 of the rear polarizer (not shown) disposed on the back surface of pixellated display panel 102. The rear element 104 may comprise, for example, a pre-polarizer. It is generally required for high efficiency that a high proportion of the light transmitted by the rear element 104 be transmitted by the rear polarizer. As such, the pass axis 106 of rear element 104 generally needs to be closely aligned with the pass axis 108 of the rear polarizer. Furthermore, design considerations generally preclude arbitrary rotation of the pass axis 108 of the rear polarizer of the display device 100. For example, the most common twisted nematic display configuration for direct viewing has diagonal front and rear pass axes. The pass axis is also sometimes referred to as the polarization axis or transmission axis of a polarizer. The light sources and other structured elements of the display device 100 may advantageously be described in above noted prior patents.

The desired viewing envelope 120 for a device is driven by the application. The transmittance envelope 110 represents the asymmetry with angle of the transmittance of rear element 104 for the polarization selected by rear polarizer pass axis 108. For example, envelope 110 could relate to an iso-transmittance contour, representing the angles for which element 104 has equal transmittance. This design exhibits reduced transmittance at steep angles of the viewing envelope 120 (possibly even lower efficiency at those angles than would result without the rear element at all) due to the mismatch between envelopes 110 and 120. In the device 100 shown, the major axis 112 of transmittance envelope 110 of rear element 104 is disposed approximately 45 degrees off of the wider axis 122 of the desired viewing envelope 120 due to the orientation of the pass axis 106 of rear element 104. As can be seen in FIG. 1, there is a substantial mismatch between actual envelope 110 and desired envelope 120. This mismatch represents a significant performance gap.

Figure 2:
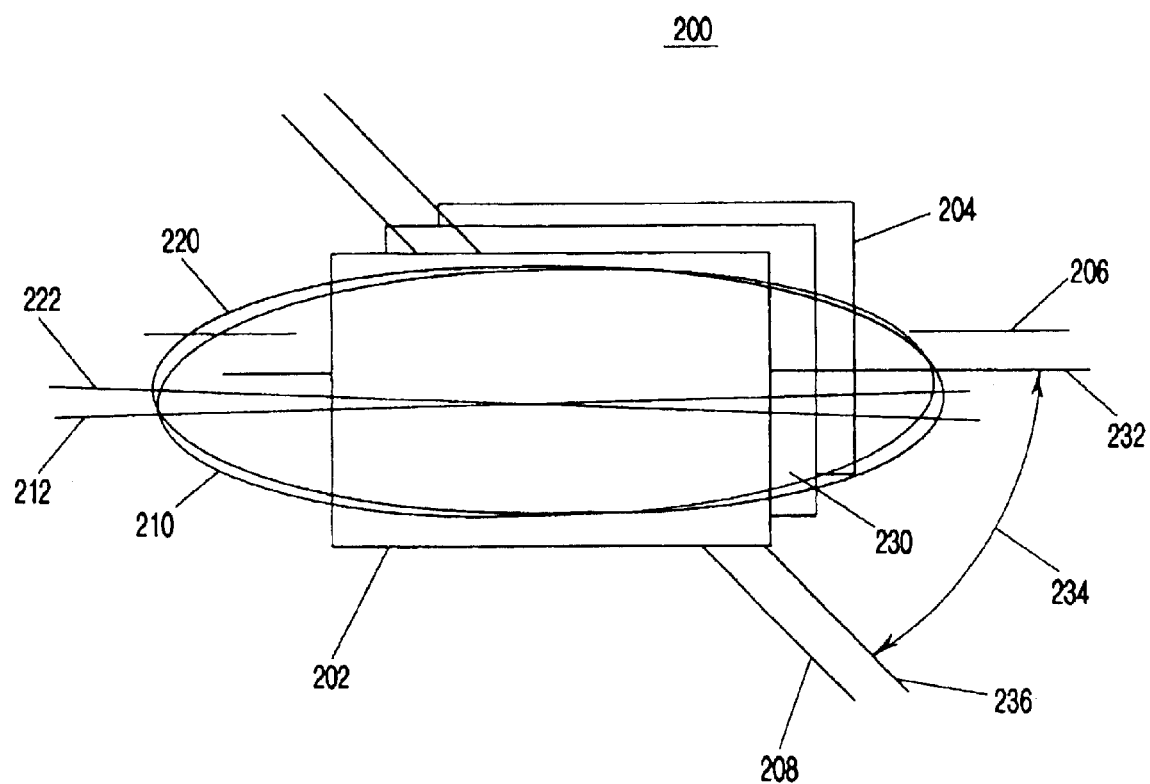
FIG. 2 depicts a polarized display device incorporating one embodiment of the present invention.

As shown in FIG. 2, a display device 200 illustrative of one embodiment of the present invention overcomes the difficulties described above by the introduction of a polarization rotation element 230 between the rear element 204 and the rear polarizer (not shown) on the back surface of the pixellated display panel 202. Light rays from a wide-angle illumination source (not shown) are incident upon rear element 204. Rear element 204 acts upon these light rays, transmitting at least a portion of said rays in the general direction of rotation element 230. Rotation element 230 rotates the light polarization from an incoming orientation 232, matching rear element pass axis 206, through angle 234 to outgoing orientation 236, matching rear polarizer pass axis 208. In accordance with an aspect of my invention, the orientation 206 of the rear element 204 is not fixed to the orientation 208 of the rear polarizer. As such, the pass axis 206 of rear element 204 can be oriented to a position optimizing the luminance envelope 210 having major axis 212 of the rear element 204 to more closely conform to the desired envelope 220, having major axis 222. Thus, this embodiment yields optimal performance at wide viewing angles.

The polarization rotation element 230 can take any of many forms, including an approximately half-wave or λ/2 plate. The choice of which particular element to use will depend upon the particular requirements of the application. Factors to be considered might include, for example, dispersion, tolerance of chromaticity shifts, and efficiency. Some non-limiting examples of suitable elements rotation element 230 include the following:

Conventional retarder such as a positive A-plate (e.g., nx>ny=nz), approximately half-wave.

Negative A-plate (e.g., nx<ny=nz), approximately half-wave.

Biaxial retarder (nx!=ny!=nz), approximately half-wave in nx-ny plane.

Multi-layer retarder structure, such as an achromatic half-wave plate or similar multi-layer structure.

Twisted optic-axis retarder, where the optic axis twists over the rotation angle within the retarder, such as a TN LCD cell without polarizers, or a similar birefringent polymer structure (such as could be fabricated using polymerizable liquid crystal (LC) or polymeric LC).

Stacked, high transmittance birefringent layers such as polarizers or retarders) where the optical axis rotates gradually from layer to layer from front to back of the stack.

There are many materials known in the art which are suitable for use as these retarders, including, without limitation, polycarbonate, acrylic, polysulfone, polyester, polyvinyl alcohol (PVA), PET, nylon, acrylonitrile, polymer liquid crystals, tri-acetyl cellulose (TAC) and others and combinations thereof.

In one form of the embodiment of FIG. 2, the polarization rotation element 230 is directly laminated to the rear polarizer of display panel 202. In another form of the embodiment of FIG. 2, the polarization rotation element 230 is directly laminated to the rear element 204. In yet another form of the embodiment of FIG. 2, the polarization rotation element 230 is captured between the rear polarizer and the rear element 204.

In one specific embodiment of the present invention, the pixellated display panel 202 shown in FIG. 2 is an active matrix liquid crystal display panel having a rear polarizer angle pass axis 208 of −45 degrees from the horizontal axis 210 of device 200. The rear element 204 is a backscattering, back-reflecting, or diffusely reflecting pre-polarizer. Pre-polarizer 204 serves to increase the efficiency of the display by returning the unused polarization to the backlight cavity (not shown) as described in U.S. Pat. Nos. 5,751,388 and 5,999,239.

The embodiment shown in FIG. 2 provides extended illumination or viewing envelopes, represented by envelopes 210 and 220 in FIG. 2. Other possible designs useful for rotation of light polarization include configurations in which polarization is rotated for relatively collimated light. The most significant effect or benefit of the embodiment in FIG. 2 over such designs is specifically realized in concert with applications requiring wide-angle illumination. The light rays in this embodiment are incident upon one or more interfaces within the system at significant angles relative to the normal (perpendicular) direction. In accordance with my invention, the display may be utilized in a direct view mode without intervening lenses or diffusers and may have a desired envelope containing angles of more than 20 degrees off of normal. More preferably, the viewing angles may contain angles in excess of 30 degrees from normal, but to obtain maximum benefit from this embodiment of the present invention, the desired viewing envelope may include angles in excess of 50 degrees from normal.

Figure 3:
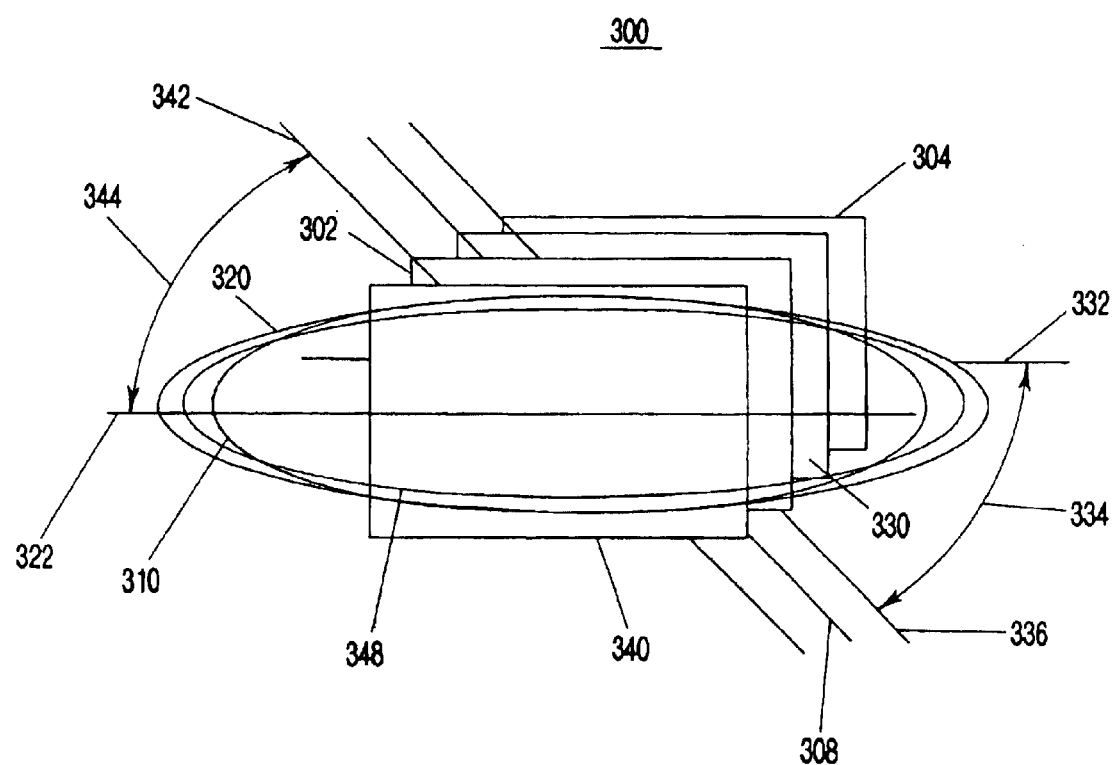
FIG. 3 depicts a polarized display device incorporating a second embodiment of the present invention.

FIG. 3 depicts another embodiment of the present invention. As shown in FIG. 3, display device 300 incorporates a polarization rotation element 330 between the rear element 304 and the rear polarizer (not shown) on the back surface of the pixellated display panel 302. Rotation element 330 rotates the light polarization from incoming orientation 332 through angle 334 to outgoing orientation 336, matching rear polarizer pass axis 308. It is readily seen that these elements are essentially equivalent to elements 200–236 of FIG. 2.

In addition to elements 302–336, the embodiment shown in FIG. 3 incorporates an additional polarization rotation element 340 disposed on the front surface of the pixellated display panel 302. Element 340 rotates the polarization of the light transmitted out of the front surface of the display panel 302 from orientation 342 through angle 344 to orientation 322.

It can be seen in FIG. 3 that orientation 322 lies along the major axis of the desired viewing envelope 320. When used in concert with the appropriate optical devices, orientation of the polarization along axis 322 has the effect of further broadening the viewing envelope in the major axis 322 of the desired viewing envelope 320. Envelope 310 represents the actual transmittance envelope, not including the fixed, intrinsic transmittance envelope (not shown) of display panel 302, that would result absent rotation element 340, while envelope 348 represents the envelope of device 300 incorporating rotation element 340. Similarly, front rotation element 340 could be used advantageously in such a system independently of the presence of elements 304 and 330.

Figure 4:
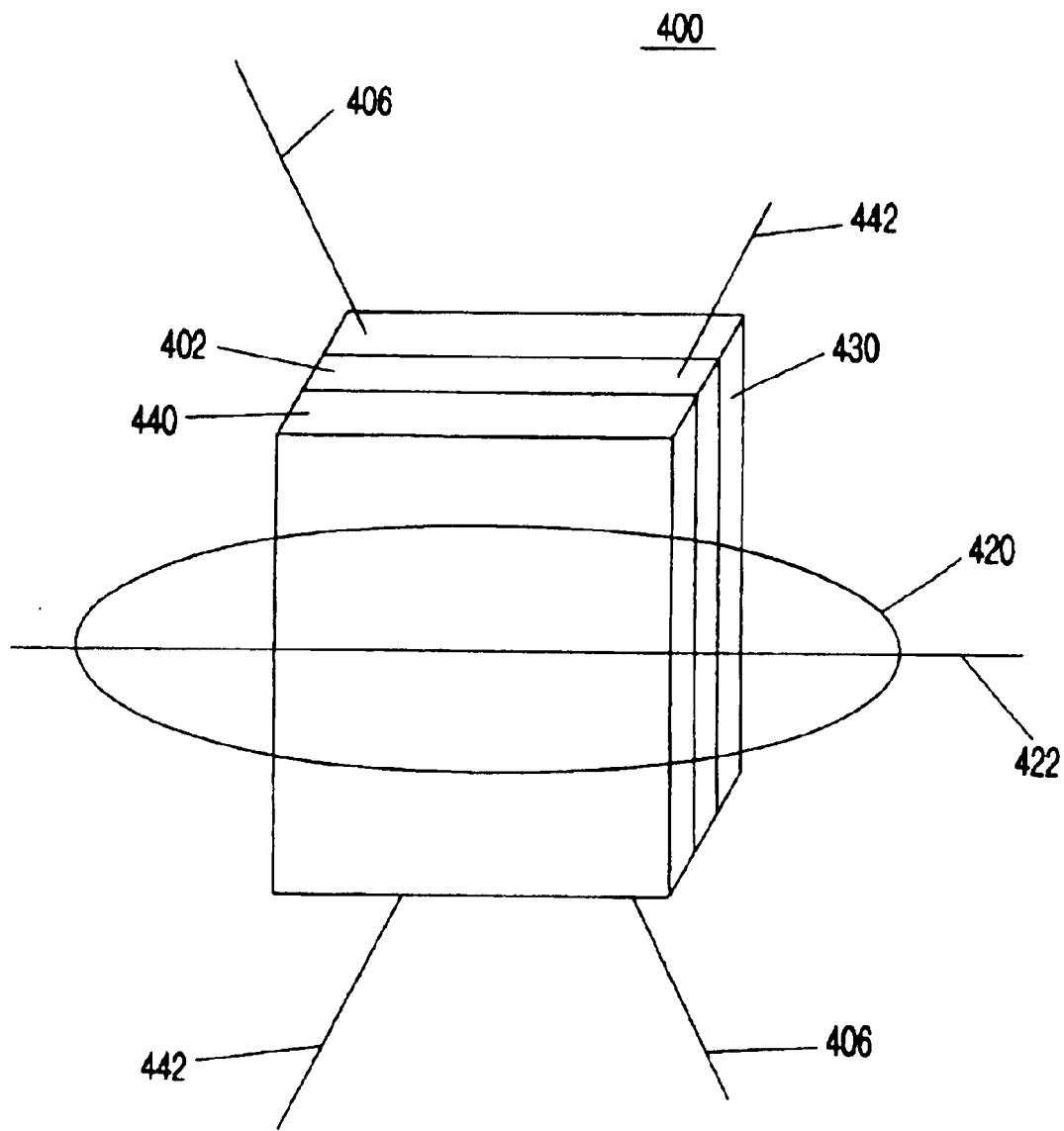
FIG. 4 depicts a polarized display device incorporating a third embodiment of the present invention.

FIG. 4 depicts another embodiment of the present invention. In this embodiment, the polarization rotating element 430 is placed directly behind the display panel 402. Polarization rotating element 430 is oriented such that light incident from the rear which is polarized along the major axis 422 of the desired viewing envelope 420 has its polarization rotated to match the rear polarizer pass axis 406. To enable the benefits of this embodiment, polarization rotating element 430 is preferably index matched to the rear polarizer of the display panel, meaning that it is directly laminated or otherwise attached without an intervening air gap. This allows the rear surface reflections to be minimized throughout the desired viewing angle. Similarly, front polarization rotation element 440, which is preferably index matched to the front of display panel 402, rotates the polarization 442 of light rays exiting display panel 402 to match the major axis 422 of the desired viewing envelope 420. While the angles are shown in FIG. 4 are representative of many typical LCD configurations, the invention should be understood to be general in nature, as the exact angles vary for different LCD modes and different applications.

Figure 5:
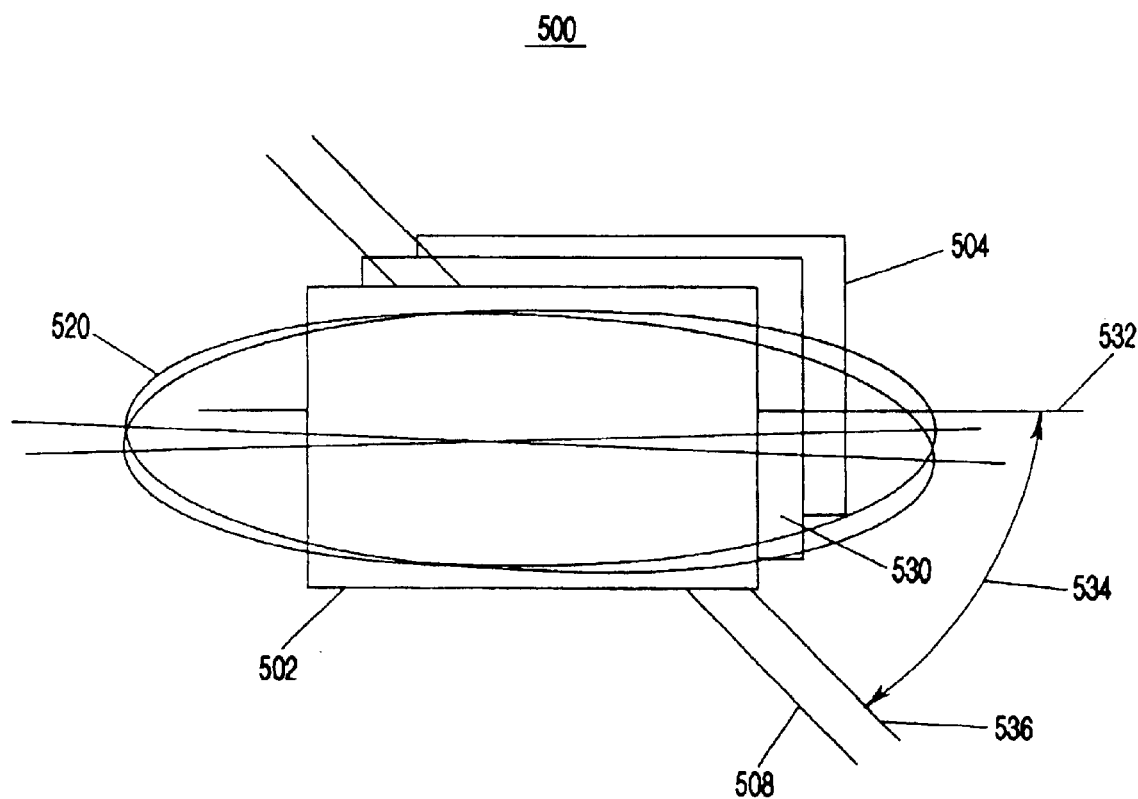
FIG. 5 depicts a polarized display device incorporating a fourth embodiment of the present invention.

FIG. 5 shows another embodiment of the present invention. While similar to the embodiment of FIG. 2 (see discussion with respect to FIG. 2 for elements that are common to FIG. 5 and, accordingly, those commonalities will not be discussed again), this embodiment utilizes a rear element 504 that does not have a pass axis. For example, the rear element might consist of one or more layers of glass, diffuser material, Indium tin oxide (ITO) or other materials which do not function as a pre-polarizer. Rather, the polarization rotation is utilized to reduce the surface reflections from these elements in the outer angles of the desired viewing envelope 520. As shown in FIG. 5, a display device 500 incorporating the present invention introduces a polarization rotation element 530 between the rear element 504 and the rear polarizer (not shown) on the back surface of the pixellated display panel 502. A portion of any light rays incident on the back of the display device 500 will be at least partially polarized by surface reflections provided that the rays are incident upon any surfaces at non-normal angles. Rotation element 530 acts upon these rays, rotating any light polarization along an incoming orientation 532, through angle 534 to outgoing orientation 536, matching rear polarizer pass axis 508. With this design, the natural reduction of reflectance for certain polarizations at certain angles of incidence is leveraged to optimize transmittance over the desired envelope 520. As such, this embodiment yields optimal performance at wide viewing angles.

The rear element 504 of FIG. 5 can take other forms as well. In one embodiment, the rear element 504 is a directional control film, such as the prismatic Brightness Enhancement Film (BEF) available from the Minnesota Mining and Manufacturing Company (3M™). With a suitable backlight configuration, films such as these concentrate the light into a confined angular range. The present invention can significantly increase the display output near the edges of the angular range. The effect of surface reflections with these films can be significant due to the large angles of incidence associated with rays passing through the prismatic film.

Throughout these embodiments, the polarization rotation element has been described as providing rotation from one orientation of linear polarization to another orientation of linear polarization. Those skilled in the art will recognize, however, that no single ideal solution exists for doing this for all wavelengths and all incident angles. This is accommodated in the present invention by providing polarization rotation that is substantially from one linear polarization to another linear polarization, optimized over the desired performance or viewing envelope.

Depending upon the detailed characteristics of the rear element and the components of the display panel, it is generally preferred to deviate slightly from a simple polarization rotation design to optimize performance fully over the desired envelope. This can be done by iteratively adjusting the polarization rotation element empirically or by simulation until an appropriate merit function is optimized over the desired envelope. As a non-limiting example, most polarizer films used as rear or front polarizers in LCDs incorporate a transparent polymer substrate such as TAC on the outside of the actual polarizing layer. Generally, this transparent film exhibits birefringence which can affect the angular performance. It is desirable to adjust the design of the polarization rotation element to compensate for this birefringence in a manner favorable to the desired viewing envelope.

Specifically, and in accordance with another aspect of my invention, the polarization rotation element is a single layer half wave retarder in which relatively uniform performance is obtained as angle of incidence varies over a wide range. This can be provided, for example, by a conventional polycarbonate or PVA retarder, or by an acrylonitrile retarder or acrylonitrile copolymer retarder, such as described in U.S. Pat. No. 5,867,239, herein incorporated by reference, or other retarder having similar characteristics.

Figure 6:
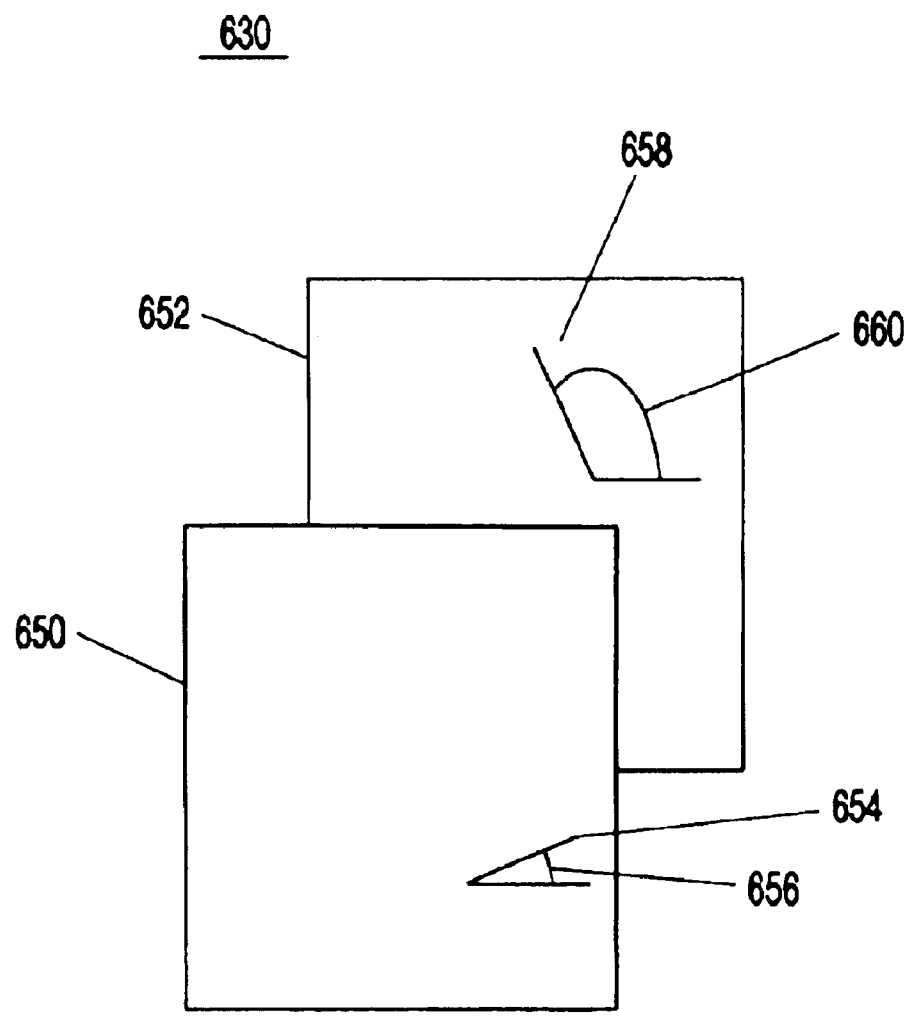
FIG. 6 depicts one embodiment of a polarization rotation element according to the present invention.

Another embodiment is illustrated by FIG. 6., which shows a polarization rotation element 630 including retarders 650 and 652. The retarder 650 has optic axis 654 oriented at angle 656, and retarder 652 has optic axis 658 oriented at angle 660. The retardances and angles are adjusted to provide optimal rotation for the display in which the rotator is used. In this embodiment, each of the two retarders 650 and 652 is a positive A-plate preferably having an in-plane retardance of about 200 nm. Angles 654 and 656 are preferably 14 degrees and 129 degrees respectively. Rotation element 630 is effective for use as element 230 in the embodiment of FIG. 2 and substantially rotates the polarization by an angle 234 of approximately 45 degrees. The layers are preferably laminated together and also laminated to the polarizer. It may also be used in the embodiments shown in other Figures herein as well. Those skilled in the art will recognize that analogous rotator elements can be made by using properties of symmetry to rotate polarization in other directions and that other multiple layer configurations can be constructed.

Measurements using the configuration just described show minimal effects at normal incidence, as expected for a polarization rotator, and a significant increase in transmittance at wider angles such as 55 degrees and −55 degrees from normal in the horizontal direction. Tests were conducted using a variety of rear elements, including bare glass, ITO glass, BEF films, pre-polarizers diffusers and the exterior surface alone, as in the embodiment of FIG. 4. The degree of increase was reasonably consistent with straightforward predictions or measurements of the polarization sensitive transmittance of the air interfaces or rear element.

Figure 7:
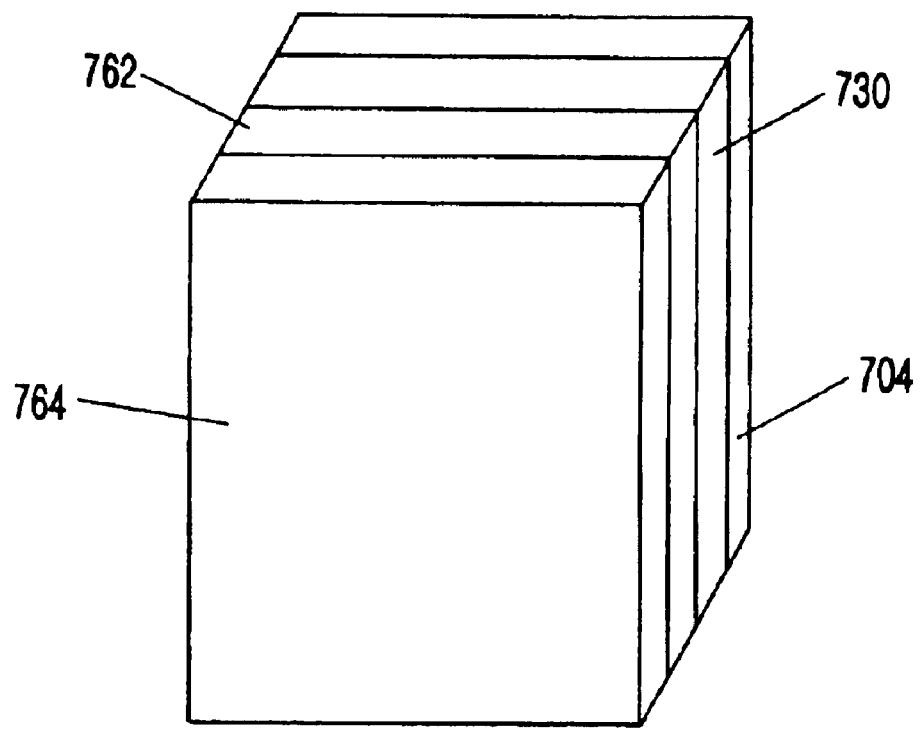
FIG. 7 depicts a polarized display device incorporating a fifth embodiment of the present invention.

Yet another embodiment of the present invention is shown in FIG. 7, which is a reflective mode display device. Front polarizer 764 polarizes light rays, not shown, which are incident on the front of the display device 700. The source of these rays, including wide angle rays, could be ambient light, or could instead be light specifically generated and directed toward the front of the display device. Addressable polarization control element 762 selectively changes the polarization state of light rays transmitted by front polarizer 764. These light rays then pass through polarization rotation element 730. A portion of the rays are reflected, or backscattered, by optical element 704 and either exit through the elements in reverse order or are absorbed by front polarizer 764 or polarization control element 762. Addressable polarization control element 762 can comprise, for example, a device utilizing any of the polarized display LCD modes previously described. Optical element 704 could comprise any element which substantially diffusely reflects or backscatters light of a first linear polarization while substantially absorbing or transmitting light of a second polarization orthogonal to the first. Some examples would be a reflective or backscattering polarizer such as a polarization sensitive scattering element (PSSE) as described in U.S. Pat. Nos. 5,751,388 and 5,999,239, or an assembly of an absorbing polarizer and a reflector behind it.

Optical element 704 is preferably a backscattering PSSE. The scattering profile of such an element is a function of the morphology, such as shape, size, orientation or aspect ratios, of the microstructure of the element. For example, a PSSE including long oriented rods, droplets or fibers will tend to have a different directionality of scatter than a PSSE including flat domains. The present invention provides an additional degree of freedom in that the PSSE axis can be oriented largely independently of the design of elements 762 and 764. This allows optimization of the viewing envelope for the reflective mode as well.

In addition to the reflective mode as described, the device can also be suitable for backlighting, depending upon the nature of the rear element 704. Here again, the use of the polarization rotation element 730 allows for optimization of the viewing geometry of the display device. Yet a further variation of the embodiment of FIG. 7 is to use the combination of polarization rotation element 730 and a diffusing PSSE 704 in an analogous manner as a front or rear projection screen for polarized light.

Figure 8:
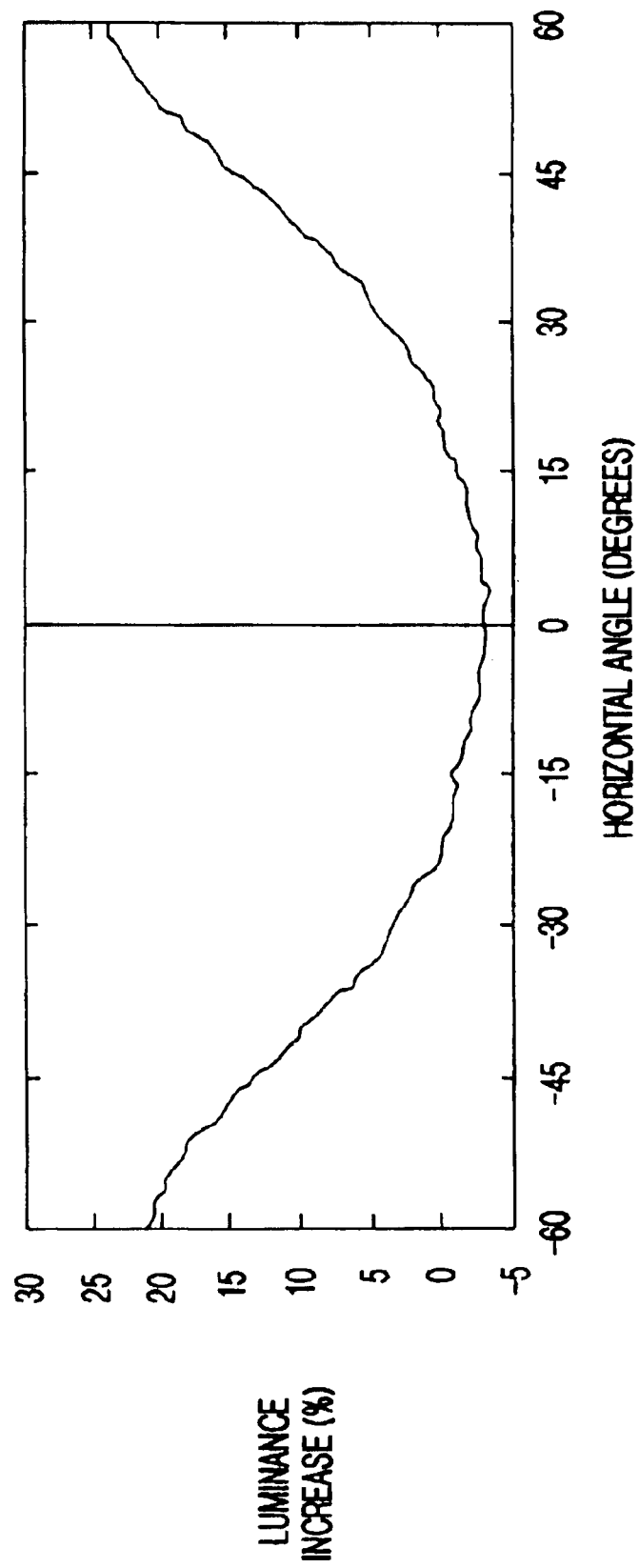
FIG. 8 depicts measured improvement in performance for an embodiment of the present invention.

One set of measured data is shown in FIG. 8. The experimental setup for this measurement was based upon the embodiment of FIG. 2. A normally white twisted nematic cell was used as the display panel, and the rear element was a commercially-available 3M™ Diffuse Reflective Polarizer. The polarization rotation element and polarizer angles were configured as described in the embodiment of FIG. 6. The assembly was diffusely backlit and luminance was measured both without and with the present invention. In the nominal configuration (see FIG. 1), the rear element polarization axis was aligned with the rear polarizer polarization axis. In the improved configuration, the polarization axis of the rear element was rotated to horizontal, and the polarization rotation element was laminated to the rear polarizer. The increase in luminance as a function of horizontal viewing angle, at zero degrees vertical viewing angle, is shown in FIG. 8 as percentage improvement ($L_{improved}/L_{nominal}-1$) *100. A significant relative increase of as much as 23% is seen as the horizontal angle deviates from perpendicular.

Figure 9:
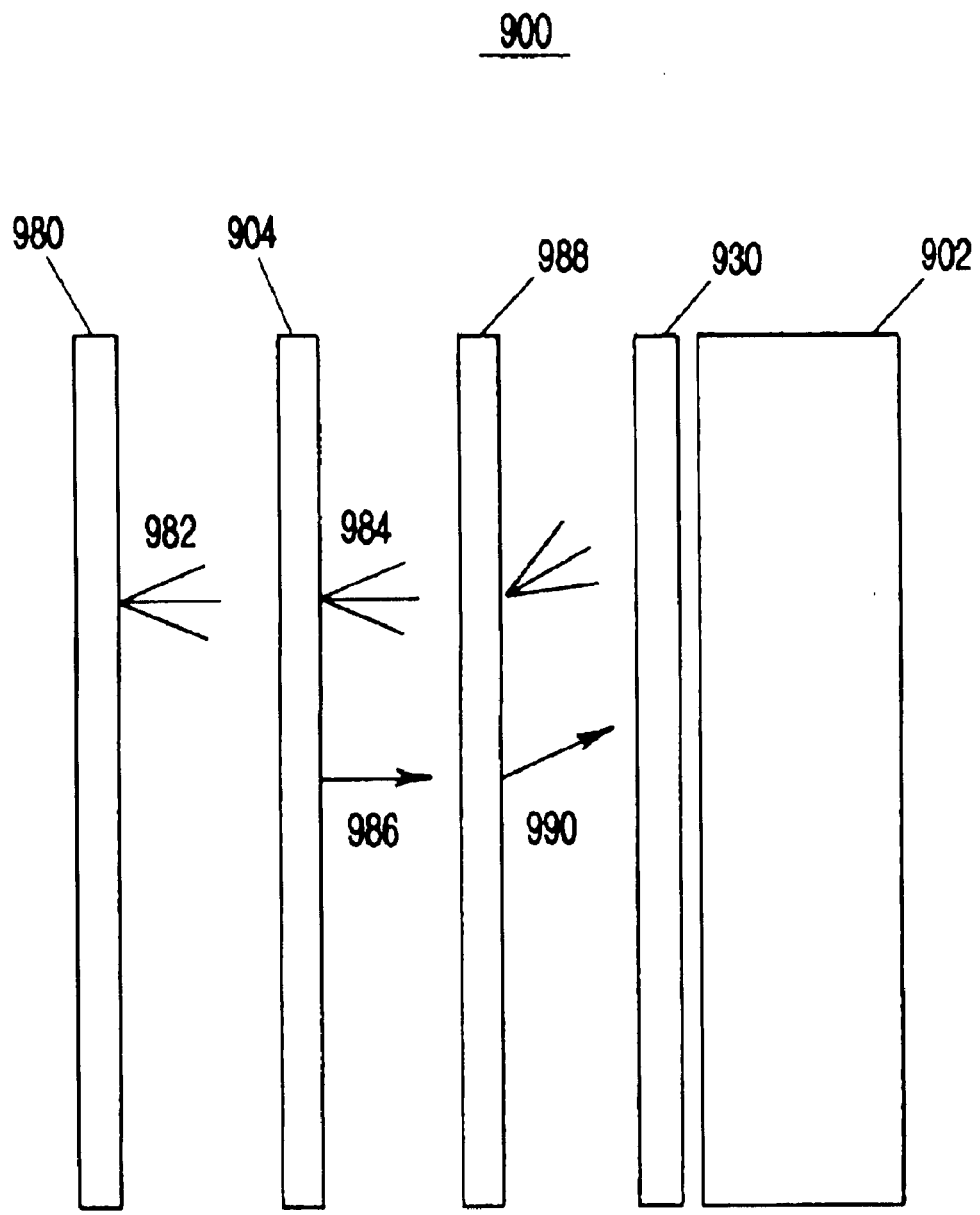
FIG. 9 depicts a polarized display device incorporating an embodiment of the present invention.

A further embodiment of the present invention is shown in FIG. 9. Here the properties of the polarization rotating element are combined with additional light redirecting elements to yield additional benefits. FIG. 9 shows a side view of a backlit display configuration 900. The wide angle illuminator 980 provides light rays 982 which then pass through rear element 904. Rays 984 exit rear element 904 in a general direction 986 and are incident upon light redirecting element 988. Rays 984 are redirected by light redirecting element 988 to a new direction 990, after which they pass through polarization rotating element 930 and polarized display panel 902. The operation of polarization rotating element 930, rear element 904 and display panel 902 is as described previously. Combination of these elements with light redirecting element 988 allows simultaneous optimization of wide angle performance and viewing envelope matching. Light redirecting element 988 can take any of several forms, including those known to those skilled in the art, such as a Fresnel lens, Fresnel prism, diffractive element, holographic element, polarization preserving diffuser and others. For each input direction 986 there is one or more corresponding output directions 990.

Numerous variations of the present invention are possible as will become apparent to those skilled in the art. In addition to varied orientations of the envelopes and component axes, and the varied options for the form of the polarization rotator, the present invention can be used advantageously in combination with other rear elements, either instead of or in conjunction with a pre-polarizer. Examples of such optical elements include heater glass, diffusers, directionality films or EMI filters. Each of these can have its own viewing angle limitations, either by design or as an artifact of the detailed nature of the element and its polarization-sensitive transmittance. For example, use of the present invention could reduce the need for expensive anti-reflection coatings on such elements. The polarization sensitivity of transmittance in prismatic directionality films can be leveraged.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

I claim:

1. A polarized display device having an expanded angle of illumination for optimizing a viewing angle in a desired plane comprising:
   a direct view polarized display panel; and
   a transmissive polarization rotating element proximate to an exterior surface of the polarized display panel, wherein said transmissive polarization rotating element rotates light polarization between a first linear polarization orientation and a second linear polarization orientation.

2. The polarized display device of claim 1 wherein said first linear polarization orientation comprises an incoming orientation and said second linear polarization orientation comprises an outgoing orientation.

3. The polarized display device of claim 2 wherein said incoming orientation comprises a rear element pass axis and said outgoing orientation comprises a rear polarizer pass axis.

4. The polarized display device of claim 1 wherein said transmissive polarization rotating element is index matched to the direct view polarized display panel.

5. The polarized display device of claim 1 wherein the first linear polarization orientation is aligned with a major axis of a desired viewing envelope.

6. The polarized display device of claim 1 wherein said transmissive polarization rotating element is located in front of the direct view polarized display panel.

7. The polarized display device of claim 1 wherein said transmissive polarization rotating element is located to a rear of the direct view polarized display panel.

8. The polarized display device of claim 1 further comprising an optical element adjacent to a first side of said transmissive polarization rotating element and the direct view polarized display panel adjacent to a second side of said polarization rotating element.

9. The polarized display device of claim 8 wherein the optical element has polarization-sensitive asymmetric transmittance characteristics related to Brewster angle effects.

10. The polarized display device of claim 8 wherein the optical element has a polarization axis.

11. The polarized display device of claim 10 wherein the optical element comprises a polarization sensitive scattering element.

12. The polarized display device of claim 8 wherein the optical element is an optical film.

13. The polarized display device of claim 1 wherein the transmissive polarization rotating element comprises a member from the group consisting of a retarder, a halfwave retarder, a multilayer retarder and a twisted optical axis element.

14. The polarized display device of claim 1 wherein the viewing angle comprises an angle of more than 20 degrees off of normal.

15. The polarized display device of claim 1 wherein the direct view polarized display panel is an active matrix liquid crystal display.

16. An apparatus for improving the viewability characteristics of a polarized display panel comprising:
    a polarization sensitive scattering element having a polarization axis; and
    a transmissive polarization rotating element attached to an exterior surface of the polarization sensitive scattering element, wherein said transmissive polarization rotating element rotates light polarization between a first linear polarization orientation and a second linear polarization orientation.

17. The invention of claim 16 wherein said polarization axis of said polarization sensitive scattering element is oriented such that a major axis of a transmittance envelope associated with said polarization sensitive scattering element is oriented along a desired viewing angle.

18. A method of projecting light using a polarized display, the method comprising the steps of:
    transmitting light from a rear optical element in an asymmetric angular pattern for a first linear polarization and having a transmittance envelope with a major axis for the first linear polarization;
    receiving light by a transmissive polarization rotating element from said rear optical element in the first linear polarization;
    rotating light to a second linear polarization by the transmissive polarization rotating element; and
    receiving light from the transmissive polarization rotating element in the second linear polarization by a polarized display panel having a rear polarizer.

19. The method of claim 18 further comprising the step of selecting a range of angles to be optimized.

20. The method of claim 19 wherein the step of selecting a range of angles comprises selecting a material for the transmissive polarization rotating element that corresponds with the selected angle.

21. The method of claim 20 wherein the step of selecting a material comprises selecting a material with predetermined retardances and angles.

22. A polarized display device comprising:
    a rear optical element transmitting light in a pattern and having a first linear polarization;
    a direct view polarized display panel having a rear polarizer oriented to receive light from the rear optical element in the first linear polarization and transmit light in a second linear polarization; and
    a transmissive polarization rotating element affixed to an exterior surface of the direct view polarized display panel receiving light from the direct view polarized display panel in the second linear polarization, rotating the light to a third linear polarization, and transmitting the light.

23. The polarized display device of claim 22 wherein the pattern of light transmitted by the rear optical element has a major axis and a minor axis, the major axis being aligned with the pass axis of the polarized display panel and being significantly broader than the minor axis.

* * * * *